United States Patent
Ikeuchi et al.

(10) Patent No.: US 8,303,525 B2
(45) Date of Patent: Nov. 6, 2012

(54) WALKING ASSIST DEVICE

(75) Inventors: Yasushi Ikeuchi, Wako (JP); Jun Ashihara, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 708 days.

(21) Appl. No.: 12/522,998

(22) PCT Filed: Apr. 7, 2008

(86) PCT No.: PCT/JP2008/056880
§ 371 (c)(1),
(2), (4) Date: Jul. 13, 2009

(87) PCT Pub. No.: WO2008/155944
PCT Pub. Date: Dec. 24, 2008

(65) Prior Publication Data
US 2010/0076355 A1 Mar. 25, 2010

(30) Foreign Application Priority Data
Jun. 20, 2007 (JP) ................. 2007-162360

(51) Int. Cl.
*A61H 1/00* (2006.01)
*A47D 13/04* (2006.01)
*A61F 2/80* (2006.01)

(52) U.S. Cl. ............... 601/35; 601/134; 482/66; 623/34

(58) Field of Classification Search ............ 623/27, 623/34, 53; 482/51, 66; 601/5, 33–35, 23; 602/23, 16, 19, 5
See application file for complete search history.

(56) References Cited

FOREIGN PATENT DOCUMENTS

| JP | 2005-152379 | | 6/2005 |
|---|---|---|---|
| JP | 2006-075198 | | 3/2006 |
| JP | 2007020909 | * | 1/2007 |
| JP | 2007-020909 | | 2/2007 |
| JP | 2007-054616 | | 3/2007 |
| JP | 2007-089652 | | 4/2007 |

OTHER PUBLICATIONS

English translation of JP patent listed above.*

* cited by examiner

*Primary Examiner* — Patricia Bianco
*Assistant Examiner* — Tarla Patel
(74) *Attorney, Agent, or Firm* — Rankin, Hill & Clark LLP

(57) ABSTRACT

Provided is a walking assist device including a seat member having a holding portion to be held by a user, a leg link connected to the seat member, and a driving source capable of driving the leg link in a direction of pushing up the seat member. At least a part of the body weight of a user is supported by the leg link through the seat member. The walking assist device can be self-mounted easily by the user. When a holding detection unit detects that the holding portion is held by the user, the walking assist device performs a mounting assist control by driving the leg link in the direction of pushing up the seat member until a seating detection unit detects the contact of the seat member with the crotch of the user.

14 Claims, 5 Drawing Sheets

WALKING ASSIST DEVICE

PRIORITY CLAIM

The present application is based on and claims the priority benefit of Japanese Patent Application 2007-162360 filed on Jun. 20, 2007, the contents of which are incorporated herein by reference in its entirety.

BACKGROUND OF THE INVENTION

1. Field of the Invention

The present invention relates to a walking assist device which assists a user in walking by alleviating a load acted on a leg thereof.

2. Description of the Related Art

Conventionally, there has been known a walking assist device having a seat member where a user sits astride, a leg link connected to the seat member and a driving source capable of driving the leg link in a direction of pushing up the seat member (for example, refer to Japanese Patent Laid-open No. 2007-20909). The driving source in this type of walking assist device drives the leg link in the direction of pushing up the seat member; therefore, at least a part of a body weight of the user is supported by the leg link through the seat member, and as a result thereof, the walking assist device can assist the user in walking by alleviating a load acted on a leg thereof.

However, when the conventional walking assist device is actually used, first, the user performs a mounting operation of the walking assist device by lifting the seat member with fingers thereof put on a bottom surface of the seat member until the seat member comes in contact with a crotch thereof; thereafter, the user performs a walking assist control which supports at least a part of the user's body weight by driving the leg link in the direction of pushing up the seat member with the driving source. Herein, when the seat member is lifted, the leg link is also lifted as a result of following the lifted seat member. Thereby, the weight of the leg link including the driving source becomes a load acted on the fingers put on the bottom surface of the seat member, causing the fingers to slip off therefrom; it is possible that the seat member may not be lifted up successfully. Consequently, the aid from another person would become necessary from time to time as the user cannot mount the walking assist device thereon independently.

SUMMARY OF THE INVENTION

The present invention has been accomplished in view of the aforementioned problems, and it is therefore an object of the present invention to provide a walking assist device which can be self-mounted easily by a user through modifying a conventional art.

To attain an object described above, the present invention provides a walking assist device having a seat member where a user sits astride, a leg link connected to the seat member and a driving source capable of driving the leg link in a direction of pushing up the seat member, in which at least a part of a body weight of the user is supported by the leg link through the seat member, wherein the seat member is provided with a holding portion to be held by the user.

According to the present invention, the user can hold the holding portion to lift up the seat member easily. Thereby, the walking assist device can be self-mounted easily by the user, making it convenient in use.

It is desirable for the present invention to include a control unit for the driving source; and a holding detection unit configured to detect whether the holding portion is held, wherein the control unit is configured to perform a predefined control according to a detection result from the holding detection unit.

In particular, when a seating detection unit configured to detect whether the seat member is in contact with a crotch of the user is included in the present invention, it is desirable that the control unit is configured to perform a mounting assist control as the predefined control by driving the leg link in the direction of pushing up the seat member until the seating detection unit detects the contact of the seat member with the crotch of the user when the holding detection unit detects that the holding portion is held by the user. According thereto, the user can lift up the seat member to come into contact with the crotch thereof by only gripping the holding portion. Thereby, the walking assist device can be mounted without applying any burden to the user, which makes it further convenient in use.

It is desirable that the present invention further includes a ground contacting member connected to a lower end of the leg link for being mounted to a foot of the user, and a foot detection unit configured to detect whether the ground contacting member is mounted to the foot of the user, wherein the control unit is configured to prohibit the mounting assist control from being performed until the foot detection unit detects that the ground contacting member is mounted to the foot of the user. According thereto, even if the holding portion is held without discretion before the ground contacting member has been mounted to the foot, the mounting assist control will not be initiated, therefore, the user will not be astonished by the lifting up of the seat member without intention.

Further it is desirable that the holding detection unit is composed of a force sensor configured to detect a force applied to the holding portion; and the control unit is configured to perform an assist force variation control in which a predefined body weight relieving assist force to be generated for the leg link is varied according to the force detected by the force sensor as the predefined control in performing a walking assist control which assists the user in walking by generating the body weight relieving assist force to support at least a part of the body weight of the user by the leg link. According thereto, in the walking assist control, the user can change the body weight relieving assist force according to the user's will by gripping the holding portion to apply a force thereto, which improves the convenience in use.

In this case, it is desirable that the control unit is configured to gradually decrease the predefined body weight relieving assist force through the assist force variation control when a force pushing the holding portion downward is being detected by the force sensor, and to perform a self weight compensation control in which the seat member is supported by the leg link by a force equivalent to a self weight of the walking assist device when the predefined body weight relieving assist force is decreased smaller than a prescribed lower limit. According thereto, the self weight compensation control is initiated when the user grips the holding portion and continues applying a force pushing the holding portion downward for a certain interval. When the self weight compensation control is initiated, the seat member descends in compliance with the holding portion being pushed downward. Consequently, the user can remove the crotch thereof from the seat member and sit on a chair or the like.

It is desirable that the present invention further includes a foot detection unit, in case that a ground contacting member connected to a lower end of the leg link for being mounted to a foot of the user, which is configured to detect whether the ground contacting member is mounted to the foot of the user, wherein the control unit is configured to perform a stop control which stops the driving source from driving the leg link when the mount of the ground contacting member to the foot of the user has not been detected by the foot detection unit in performing the self weight compensation control. According thereto, the walking assist device can be stopped simply by removing the foot of the user from the ground contacting member without additional switch operations, which makes it more convenient in use.

DETAILED DESCRIPTION OF THE PREFERRED EMBODIMENTS

Figure 1:
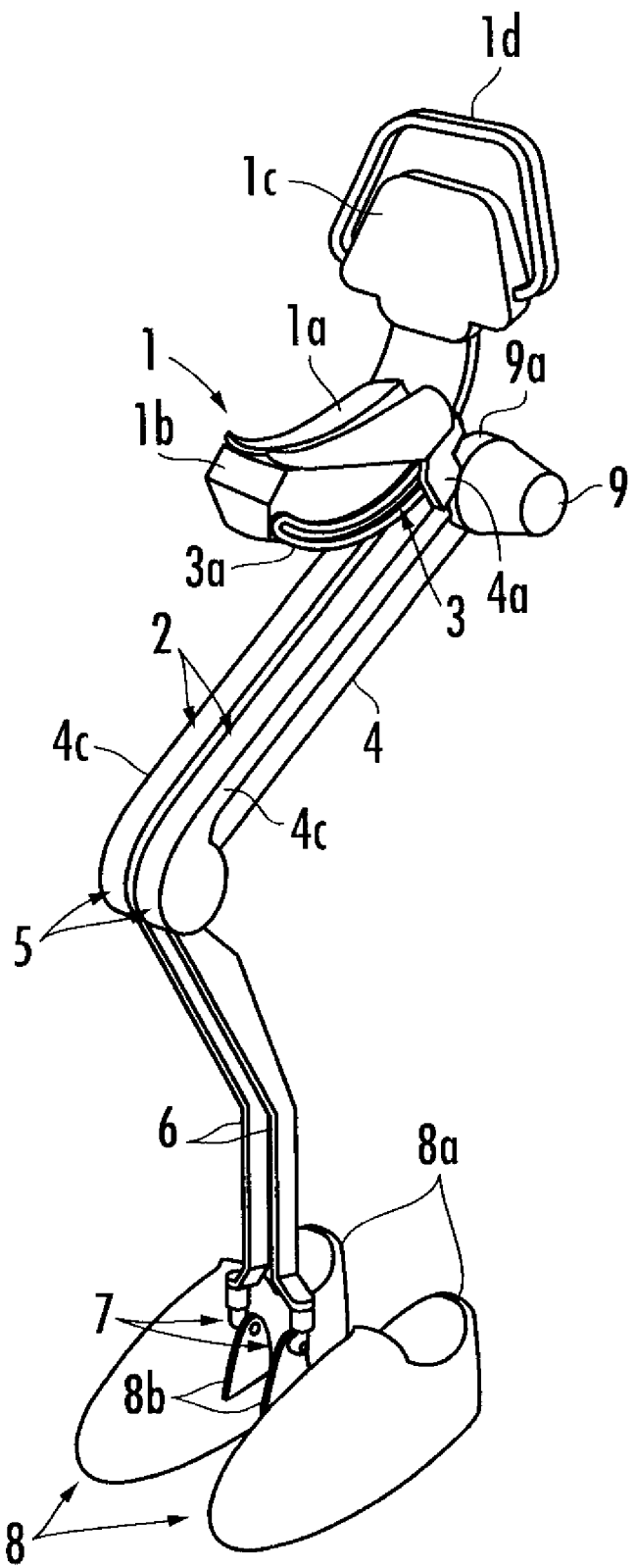
FIG. 1 is a perspective view of a walking assist device according to an embodiment of the present invention.
Figure 2:
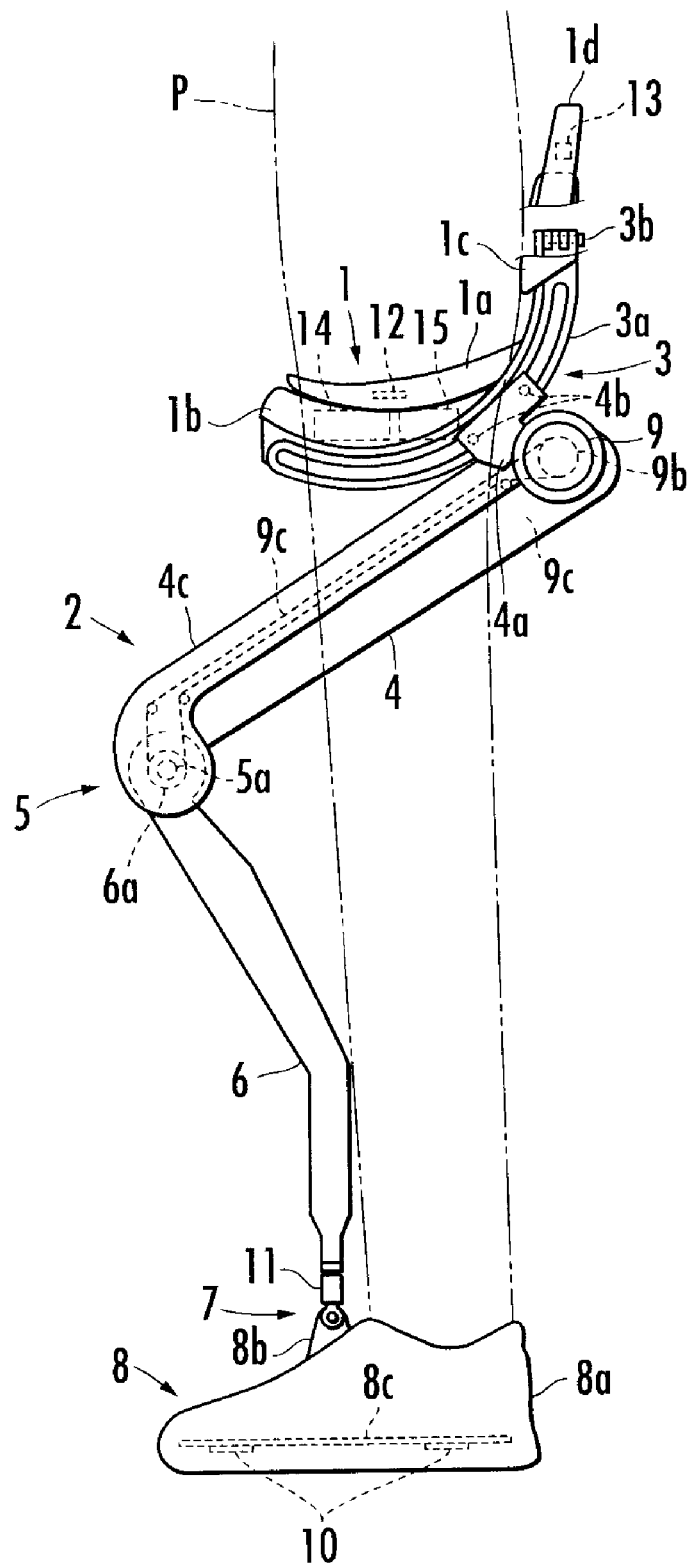
FIG. 2 is a side view of the walking assist device according to an embodiment of the present invention.
Figure 3:
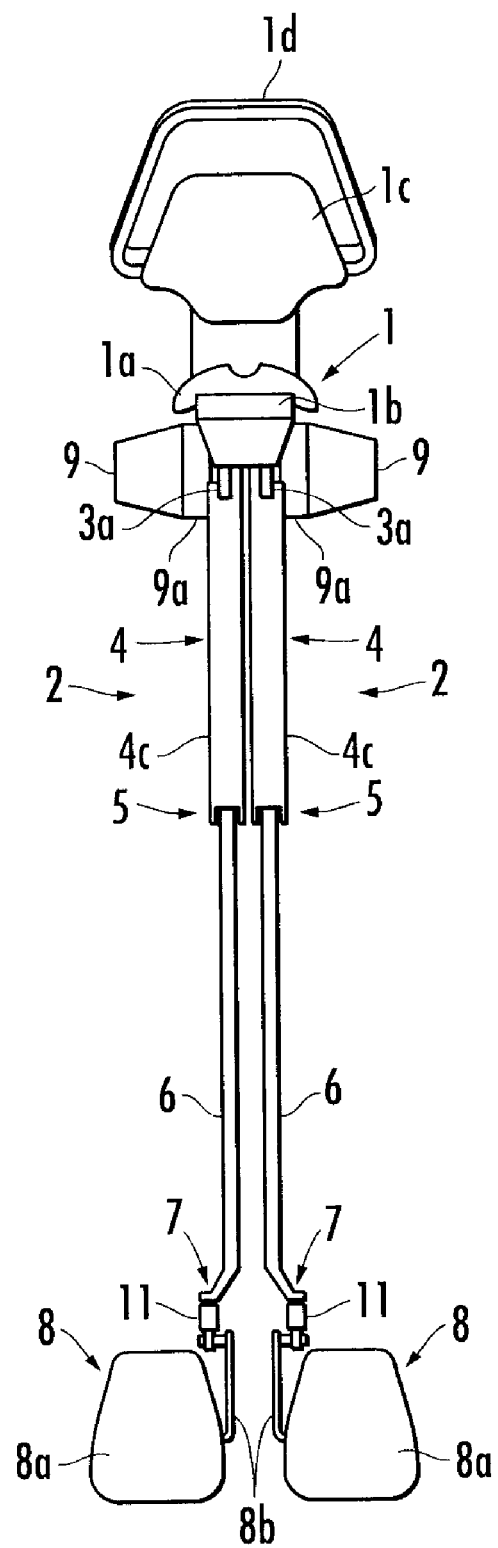
FIG. 3 is a front view of the walking assist device according to an embodiment of the present invention.

Hereinafter, a walking assist device according to an embodiment of the present invention will be described. As illustrated in FIG. 1 to FIG. 3, the walking assist device includes a seat member 1 where a user P sits astride, and a pair of left and right leg links 2 and 2 connected to the seat member 1.

Each leg link 2 can bend and stretch freely, composed of a first link member 4 and a second link member 6. The first link member 4 is connected to a first joint portion 3 provided in the seat member 1. The second link member 6 is connected to a lower end of the first link member 4 through a rotary-typed second joint portion 5. A lower end of the second link member 6 is connected with a ground contacting portion 8 through a third joint portion 7. The ground contacting portion 8 is configured to be mounted to each of right and left feet of the user P.

Each leg link 2 is provided with a driving source 9 for driving the second joint portion 5. Thereby, according to the rotation of the second joint portion 5 driven by the driving source 9, each leg link 2 is stretched in a direction of pushing the seat member 1 upward so as to generate an assist force to support at least apart of a body weight of the user P (hereinafter, referred to as a body weight relieving assist force). The body weight relieving assist force generated in each leg link 2 is transmitted to the body trunk of the user P through the seat member 1 to relieve the load acted on a leg of the user P.

The seat member 1 is composed of a seat portion 1a, a support frame 1b, and a waist supporter 1c. The seat portion 1a is of a saddle shape to be seated by the user P. The support frame 1b is disposed below the seat portion 1a to support the seat portion 1a. The support frame 1b is configured to extend upward behind the seat portion 1a to form an uprising portion at a rear end thereof. The waist supporter 1c is disposed at the uprising portion. A holding portion 1d of an arch shape is disposed in the waist supporter 1c for being held by the user P.

When the user P mounts the walking assist device thereon, first, the user P mounts each ground contacting member 8 to each foot thereof. Then, the user P lifts up the seat member 1 until the seat member 1 comes into contact with the user's crotch. Herein, the holding portion 1d is provided in the seat member 1 according to the present embodiment; therefore, it is easy to lift up the seat member 1 by gripping the holding portion 1d. As a result thereof, the walking assist device can be mounted easily.

The seat member 1 is further provided with a guide rail 3a of an arc shape, which constitutes the first joint portion 3 disposed in each leg link 2. Each leg link 2 is movably engaged with the guide rail 3a via a plurality of rollers 4b pivotally attached to a slider 4a which is fixed to the upper end of the first link member 4. In this way, each leg link 2 swings in the anteroposterior direction around the center of curvature of the guide rail 3a and the anteroposterior swing fulcrum of each leg link 2 functions as the center of curvature of the guide rail 3a.

Furthermore, the guide rail 3a is pivotally supported at the uprising portion disposed at the rear end of the support frame 1b of the seat member 1 via a spindle 3b which is disposed longitudinally in the anteroposterior direction. Therefore, the guide rail 3a is connected to the seat member 1 so as to swing freely in the lateral direction. Accordingly, each leg link 2 is allowed to swing in the lateral direction, which enables the user P to abduct the legs thereof. In addition, the center of curvature of the guide rail 3a and the axis line of the spindle 3b are both located above the seat portion 1a. Thereby, the seat member 1 can be prevented from inclining greatly in the vertical direction and in the lateral direction when the user P shifts the body weight thereof.

The driving source 9 is an electric motor provided with a reduction gear 9a, attached to a side surface of an upper end portion of the first link member 4 of each leg link 2. An output member of the reduction gear 9a, that is, a driving pulley 9b and a driven pulley 6a which is fixed concentrically with a joint axis 5a of the second joint portion 5 at the second link member 6 are connected through a wrapping transmission member 9c, such as a wire, a chain, a belt or the like. Thereby, a driving force output from the driving source 9 through the reduction gear 9a is transmitted to the second link member 6 through the wrapping transmission member 9c so that the second link member 6 swings around the joint axis 5a with respect to the first link member 4 to bend or stretch the leg link 2. Additionally, the first link member 4 is provided with a cover 4c configured to cover the wrapping transmission member 9c.

Each ground contacting portion 8 is composed of a shoe 8a and a connection member 8b which is fixed at the shoe 8a and extends upward. The second link member 6 of each leg link 2 is connected to the connection member 8b through a third joint portion 7 of a 3-axis structure. As illustrated in FIG. 2, a pair of longitudinally disposed pressure sensors 10 and 10, which detect loads acted on the metatarsophalangeal joint (MP joint) and the heel of each foot of the user P, respectively, are attached to the undersurface of an insole 8c provided in the shoe 8a. The pressure sensor 10 functions as a foot detection unit detecting whether the ground contacting member 8 has been mounted to the foot of the user P. Moreover, a 2-axis force sensor 11 is built into the third joint portion 7.

Further, the seat member 1 is provided with a pressure sensor 12 which is a seat detection unit detecting the contact of the seat member 1 to the crotch of the user P. Furthermore, a force sensor 13 for detecting a force acted on the holding portion 1d is built into the holding portion 1d. The force sensor 13 is constituted of a strain gauge or a load cell. The force sensor 13 functions as a holding detection unit for detecting that the holding portion 1d has been held. Moreover, the support frame 1b of the seat member 1 has a battery 15 and a controller 14 built therein, where the controller serves as a control unit.

Detection signals from the pressure sensors 10, the force sensor 11, the pressure sensor 12 and the force sensor 13 mentioned in the above are input to the controller 14. The controller 14 controls the driving source 9 to drive the leg link 2 according to the detection signals from the sensors.

Figure 4:
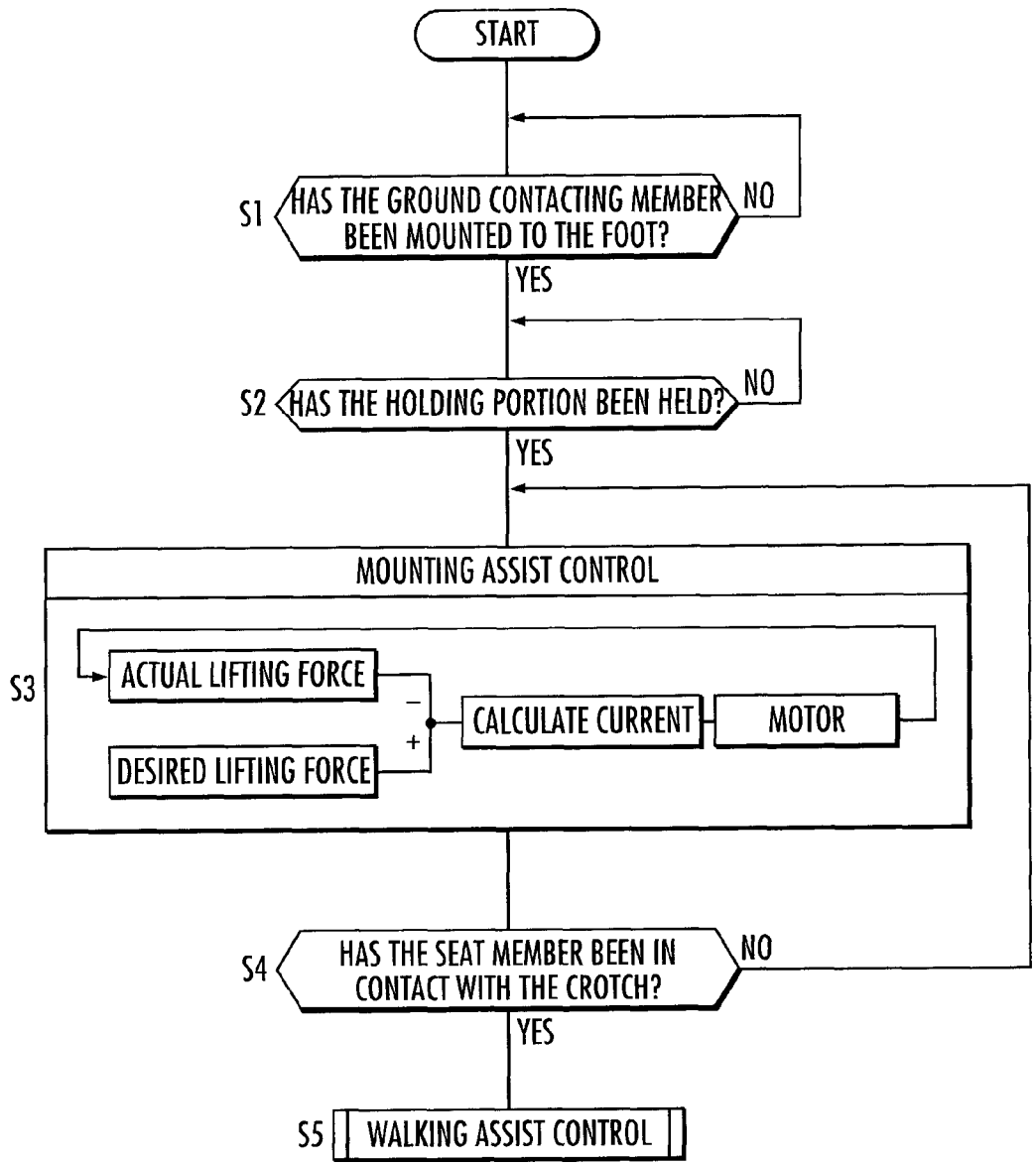
FIG. 4 is a flow chart illustrating a process performed by a control unit disposed in the walking assist device according to an embodiment of the present invention.

The control process performed by the controller 14 is illustrated in FIG. 4. First, in step S1, whether the ground contacting member 8 has been mounted to the foot of the user P is determined on the basis of the detection signals from the pressure sensor 10. If the pressure detected by the pressure sensor 10 is equal to or greater than a given value, it is determined that the ground contacting member 8 has been mounted to the foot of the user P. The process proceeds to step S2. In step S2, whether the holding portion 1d has been held, more accurately, whether the holding portion 1d has been lifted upward is determined on the basis of the detection signals from the force sensor 13. If the force detected by the force sensor 13 is equal to or greater than a given value, it is determined that the holding portion 1d has been lifted upward. The process proceeds to step S3 where a mounting assist control is performed.

In the mounting assist control, a motor serving as the driving source 9 is electrified with a current calculated according to a PD control or the like on the basis of a difference between an actual lifting force applied to the holding portion 1d, which is detected by the force sensor 13, and a desired lifting force set preliminarily. According thereto, the driving source 9 is controlled to drive the leg link 2 in the direction of pushing the seat member 1 upward so as to make the actual lifting force equal to the desired lifting force.

Subsequently, in step S4, whether the seat member 1 has been in contact with the crotch of the user P is determined on the basis of the pressure detected by the pressure sensor 12. The mounting assist control is continued until the contact is determined. When the detection force detected by the pressure sensor 12 is equal to or greater than a given value, the seat member 1 is determined to have been in contact with the crotch of the user P, and the process proceeds to step S5 where the walking assist control is performed to generate the body weight relieving assist force.

The body weight relieving assist force, when viewed in the lateral direction, is acted on a connection line (hereinafter, referred to as a reference line) joining a swing fulcrum of the leg link 2 with respect to the first joint portion 3 in the anteroposterior direction and a swing fulcrum of the leg link 2 with respect to the third joint portion 7 in the anteroposterior direction. In the walking assist control, the actual body weight relieving assist force acted on the reference line (accurately, a resultant force between the body weight relieving assist force and a force generated by the self weight of the seat member 1 and each leg link 2) is calculated based on the detection force in the biaxial direction detected by the force sensor 11. Thereafter, on the basis of the pressure detected by the pressure sensors 10 in each ground contacting portion 8, a ratio of the load acted on each foot with respect to the total load acted on both feet of the user P is calculated. Then, a desired control value of the body weight relieving assist force which should be generated for each leg link 5 is calculated by multiplying a predefined value of the body weight relieving assist force by the calculated ratio of the load acted on each foot. Subsequently, the driving source 9 is controlled so that the actual body weight relieving assist force calculated on the basis of the detection force by the force sensor 11 approximates to the desired control value.

When the user P lifts up the seat member 1 so as to mount thereon the walking assist device, the leg link 2 will be also lifted in compliance with the seat member 1, therefore, the total weight of the leg link 2 and the driving source 9 is applied to the seat member 1. However, in the present embodiment, since the leg link 2 is driven to move in the direction of pushing up the seat member 1 in the mounting assist control, the load for lifting the seat member 1 is reduced. In particular, if the desired lifting force is set to zero, the load for lifting the seat member 1 will not be applied to the user P, which makes the mounting operation of the walking assist device extremely easy.

Further, in the present embodiment, even though the holding portion 1d is held, the mounting assist control will not be performed unless each ground contacting member 8 is detected to have been mounted to each foot of the user on the basis of the detection signals from the pressure sensors 10 disposed in each ground contacting member 8. According thereto, even if the holding portion 1d is held without discretion before the ground contacting member 8 has been mounted to the foot, the mounting assist control will not be initiated, therefore, the user P will not be astonished by the lifting up of the seat member 1 without intention.

Figure 5:
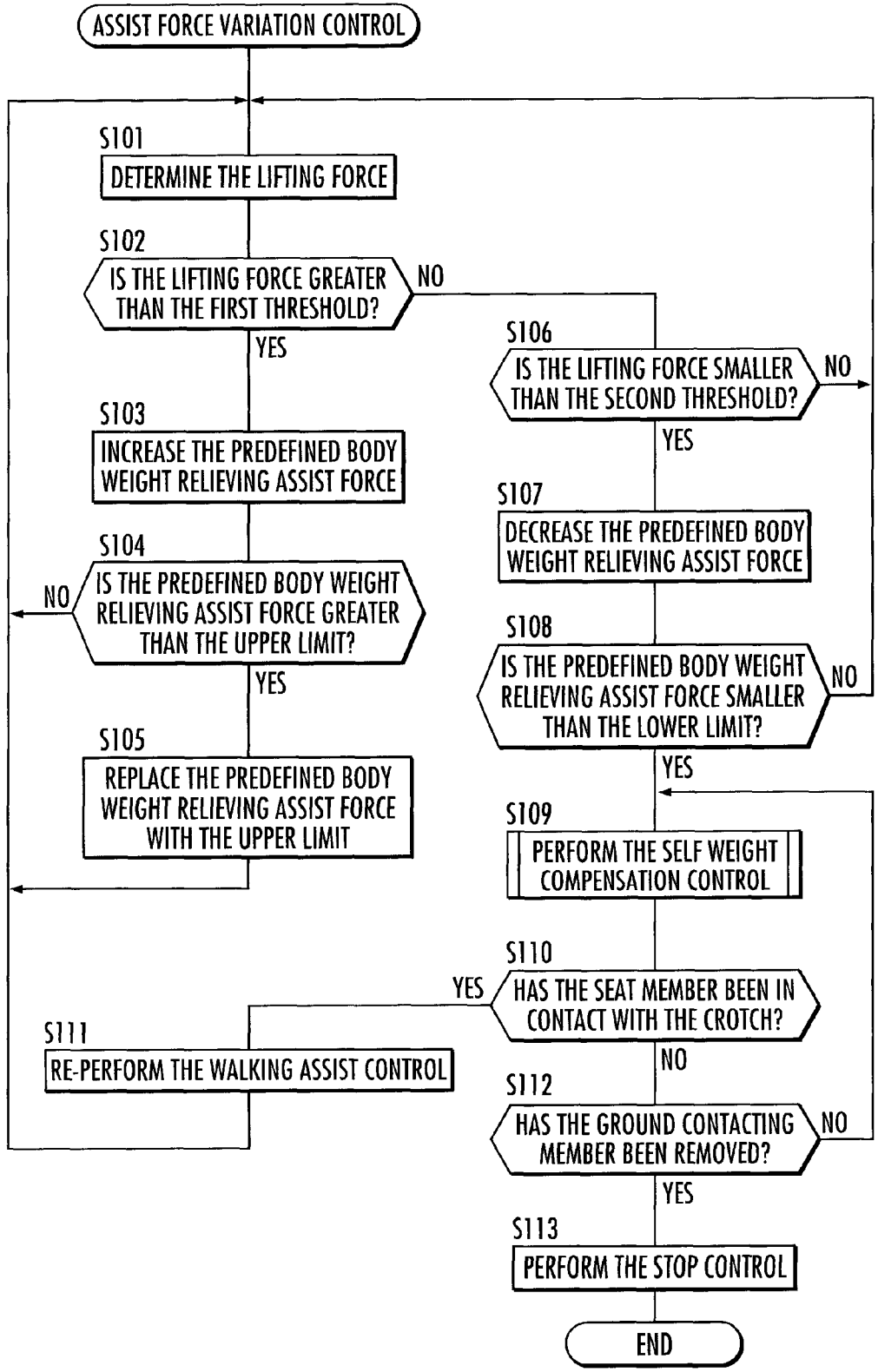
FIG. 5 is a flow chart illustrating a process of an assist force variation control performed by the control unit disposed in the walking assist device according to an embodiment of the present invention.

As illustrated in detail in FIG. 5, in the walking assist control, a control which varies a predefined value of the body weight relieving assist force (assist force variation control) is performed when the holding portion 1d is held and a force has been applied thereto. First, in step S101, the lifting force for lifting up the holding portion 1d is determined by the force sensor 13. Thereafter, in step S102, whether the lifting force applied to the holding portion 1d is greater than a prescribed first threshold (5N for example) is determined. If the lifting force is greater than the first threshold, the predefined body weight relieving assist force is increased by a given amount in step S103. Subsequently, whether the predefined body weight relieving assist force is greater than a prescribed upper limit is determined in step S104. If the predefined body weight relieving assist force is equal to or smaller than the upper limit, the process is repeated from step S101. On the other hand, if the predefined body weight relieving assist force is greater than the upper limit, the predefined body weight relieving assist force is replaced by the upper limit in step S105, and the process returns back to step S101.

If the lifting force applied to the holding portion 1d is determined to be equal to or smaller than the first threshold in step S102, the process proceeds to step S106 in which whether the lifting force is smaller than a predefined second threshold (−2N for example) set to a negative value, in other words, the force for pressing the holding portion 1d downward is greater than an absolute value of the second threshold is determined. If the lifting force is equal to or greater than the second threshold, the process returns back to step S101.

If the lifting force applied to the holding portion 1d is smaller than the second threshold, the process proceeds to step S107 in which the predefined body weight relieving assist force is decreased by a given amount. Thereafter, whether the predefined body weight relieving assist force is smaller than a predefined lower limit is determined in step S108. If the predefined body weight relieving assist force is equal to or greater than the predefined lower limit, the process is repeated from step S101.

According thereto, while the holding portion 1d is being lifted by the lifting force greater than the first threshold, the predefined body weight relieving assist force is gradually increased until it reaches the upper limit; when the lifting of the holding portion 1d is cancelled, the predefined body weight relieving assist force is maintained at the value where the lifting of the holding portion 1d is cancelled. Moreover, while the holding portion 1d is being pressed by the pressing force that is greater than the absolute value of the second threshold, the predefined body weight relieving assist force is gradually decreased until it reaches the lower limit; when the pressing of the holding portion 1d is cancelled, the predefined body weight relieving assist force is maintained at the value where the pressing of the holding portion 1d is cancelled.

When the predefined body weight relieving assist force is smaller than the lower limit, the process proceeds to step S109 where a self weight compensation control is initiated to support the seat member 1 with a force equivalent to the self weight of the walking assist device by the leg link 2. Similar to the mounting assist control described above, in the self compensation control, a motor serving as the driving source 9 is electrified with a current calculated according to the PD control or the like on the basis of a difference between an actual lifting force applied to the holding portion 1d, which is detected by the force sensor 13, and a desired lifting force set preliminarily (zero for example). Thereby, the leg link 2 is driven to move in such a way that the seat member 1 descends in compliance with the holding portion 1d which is pressed downward. When the pressing down of the holding portion 1d is cancelled, the seat member 1 is maintained at a position where the pressing down of the holding portion 1d is cancelled.

Then, the process proceeds to step S110 in which whether the seat member 1 has been in contact with the crotch of the user is determined on the basis of the pressure detected by the pressure sensor 12. When the seat member 1 has been lifted up or the like by the user to come into contact with the crotch, the process proceeds to step 111 and the walking assist control is re-started by returning back to step S101. On the other hand, if the seat member 1 is not in contact with the crotch, the process proceeds to step S112 in which whether the ground contacting member 8 has been removed from the foot of the user P is determined on the basis of the detection signals from the pressure sensors 10. If the ground contacting member 8 is still mounted to the foot, the process returns back to step S109. If the ground contacting member 8 has been removed, the process proceeds to step S113 in which the electrifying of the driving source 9 is stopped, a stop control for stopping the driving of the leg link 2 by the driving source 9 is performed, and the control process comes to an end.

According to the assist force variation control, in the walking assist control, the user P can change the body weight relieving assist force according to the user's will by gripping the holding portion 1d to apply a force thereto, which improves the convenience in use. Further, when the user P continues pressing down the holding portion 1d for a certain interval, the self weight compensation control is performed to descend the seat member 1 in compliance with the down-pressed holding portion 1d. Thereby, the user P can remove the crotch thereof from the seat member 1 to sit on a chair or the like. Furthermore, if the user P removes the ground contacting member 8 from the foot thereof, the stop control is performed. According thereto, the walking assist device can be stopped without additional switch operations, which makes it more convenient in use.

Although the embodiment of the present invention has been described hereinabove with reference to the drawings, the present invention is not limited thereto. For example, in the above-mentioned embodiment, the holding portion 1d is provided at the rear end portion of the seat member 1; it is acceptable to dispose the holding portion at a front end portion or both of the front end and rear end portions of the seat member 1. However, if the holding portion is disposed at the front end portion of the seat member 1, the holding portion may hinder the user P from performing operations such as fetching or moving an object or the like. Therefore, it is not only convenient but also advantageous to dispose the holding portion 1d only at the rear end portion of the seat member 1, as in the embodiment mentioned above. In addition, the holding portion 1d may be formed into a shape extending from the rear end portion of the seat member 1 toward the lateral sides of the waist of the user P. Moreover, it is acceptable to fix the holding portion 1d at the guide rail 3a of the first joint portion 3 provided in the seat member 1.

In the above-mentioned embodiment, the leg link 2 is configured as a telescopic link with a rotary second joint portion 5 disposed therein; it is acceptable that the leg link is configured as a telescopic link having a linear second joint portion. In the above-mentioned embodiment, the first joint portion 3 is configured to have an arc-shaped guide rail 3a and the swing fulcrum of each leg link 2 in the first joint portion 3 along the anteroposterior direction is located above the seat portion 1a of the seat member 1; however, the first joint portion 3 is not limited thereto. For example, the first joint portion 3 may be configured as a simple-structured joint portion having a spindle to pivotally support each leg link 2 so that the upper end portion thereof can freely swing in the anteroposterior direction. Moreover, in order to assist the walking of a handicapped user whose one leg is crippled due to bone fracture or the like, it is possible to leave only one leg link of the left and right leg links 2 and 2 in the above-mentioned embodiment corresponding to the crippled leg of the user P by removing the other.

What is claimed is:

1. A walking assist device having a seat member adapted for a user to sit astride, a leg link connected to the seat member, and a driving source configured to drive the leg link in a direction of pushing up the seat member, wherein at least a part of a body weight of the user is supported by the leg link through the seat member, and wherein the seat member is provided with a holding portion configured to be held by a hand of the user, the walking assist device further including:
   a control unit configured to control the driving source; and
   a holding detection unit configured to detect whether the holding portion is held, and the holding detection unit is provided at the holding portion,
   wherein the control unit is configured to perform a predefined control according to a detection result from the holding detection unit.

2. The walking assist device according to claim 1, wherein the holding detection unit includes a force sensor provided in the holding portion, the force sensor configured to detect a force acting on the holding portion, and the detection of the force acting on the holding portion is used to detect whether the holding portion is being held.

3. The walking assist device according to claim 2, wherein the holding portion is an arch shaped projection which includes a grip portion adapted to be gripped by the hand of the user, and the holding detecting unit force sensor is provided in the grip portion.

4. The walking assist device according to claim 1, wherein the holding portion is an arch shaped projection which includes a grip portion adapted to be gripped by the hand of the user, and the holding detection unit is configured to detect whether the grip portion is gripped by the hand of the user.

5. The walking assist device according to claim 4, wherein the holding portion projects from a base of the seat member.

6. The walking assist device according to claim 1, wherein the seat member includes:
   a seat portion adapted for the user to sit astride;

a support frame which supports the seat portion and connects the seat portion to the leg link; and a waist supporter supported on the support frame, the waist supporter provided in a position such that the seat portion is disposed between the waist supporter and the leg link in a vertical direction, wherein the holding portion projects from the waist supporter.

7. The walking assist device according to claim 6, wherein the holding portion is an arch shaped projection which includes a grip portion adapted to be gripped by the hand of the user.

8. The walking assist device according to claim 6, wherein the holding detection unit is configured to detect whether the grip portion is gripped by the hand of the user.

9. The walking assistance device according to claim 8, wherein the holding detection unit includes a force sensor provided in the grip portion, the force sensor configured to detect a force acting on the grip portion, and the detection of the force acting on the grip portion is used to detect whether the holding portion is being held.

10. A walking assist device having a seat member adapted for a user to sit astride, a leg link connected to the seat member, and a driving source configured to drive the leg link in a direction of pushing up the seat member, wherein at least a part of a body weight of the user is supported by the leg link through the seat member, and wherein the seat member is provided with a holding portion to be held by the user, the walking assist device further including:

a control unit configured to control the driving source;

a holding detection unit configured to detect whether the holding portion is held; and a seating detection unit configured to detect whether the seat member is in contact with a crotch of the user, wherein the control unit is configured to perform a predefined control according to a detection result from the holding detection unit, and the control unit is configured to perform a mounting assist control as the predefined control when the holding detection unit detects that the holding portion is held by the user, wherein the mounting assist control includes driving the leg link in the direction of pushing up the seat member until the seating detection unit detects the contact of the seat member with the crotch of the user.

11. The walking assist device according to claim 10, further including:

a ground contacting member connected to a lower end of the leg link for being mounted to a foot of the user; and a foot detection unit configured to detect whether the ground contacting member is mounted to the foot of the user, wherein the control unit is configured to prohibit the mounting assist control from being performed until the foot detection unit detects that the ground contacting member is mounted to the foot of the user.

12. The walking assist device having a seat member adapted for a user to sit astride, a leg link connected to the seat member, and a driving source configured to drive the leg link in a direction of pushing up the seat member, wherein at least a part of a body weight of the user is supported by the leg link through the seat member, and wherein the seat member is provided with a holding portion to be held by the user, the walking assist device further including:

a control unit configured to control the driving source;

a holding detection unit configured to detect whether the holding portion is held, wherein the holding detection unit is composed of a force sensor configured to detect a force applied to the holding portion, wherein the control unit is configured to perform a predefined control according to a detection result from the holding detection unit, and the control unit is configured to perform an assist force variation control in which a predefined body weight relieving assist force to be generated for the leg link is varied according to the force detected by the force sensor as the predefined control in performing a walking assist control which assists the user in walking by generating the body weight relieving assist force to support at least a part of the body weight of the user by the leg link.

13. The walking assist device according to claim 12, wherein the control unit is configured to gradually decrease the predefined body weight relieving assist force through the assist force variation control when a force pushing the holding portion downward is being detected by the force sensor, and to perform a self weight compensation control in which the seat member is supported by the leg link by a force equivalent to a self weight of the walking assist device when the predefined body weight relieving assist force is decreased smaller than a prescribed lower limit.

14. The walking assist device according to claim 13, further including:

a ground contacting member connected to a lower end of the leg link for being mounted to a foot of the user; and a foot detection unit configured to detect whether the ground contacting member is mounted to the foot of the user, wherein the control unit is configured to perform a stop control which stops the driving source from driving the leg link when the mount of the ground contacting member to the foot of the user has not been detected by the foot detection unit in performing the self weight compensation control.

* * * * *